(No Model.) 2 Sheets—Sheet 1.
J. P. BURNHAM.
ART OF AND MACHINE FOR DETACHING LINT FROM COTTON SEED HULLS AND SEPARATING LINT AND HULLS.
No. 523,655. Patented July 31, 1894.
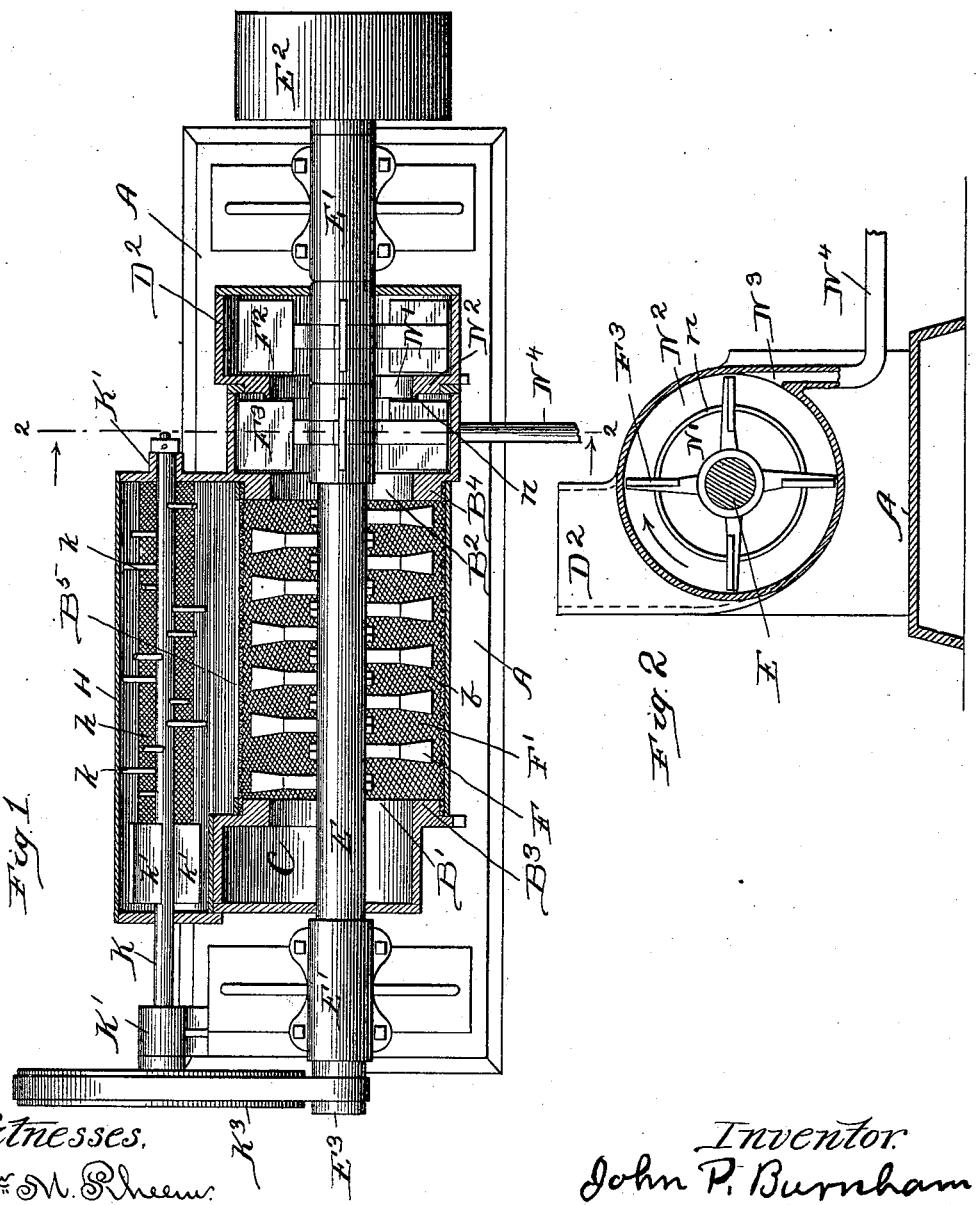

(No Model.)  2 Sheets—Sheet 2.
J. P. BURNHAM.
ART OF AND MACHINE FOR DETACHING LINT FROM COTTON SEED HULLS AND SEPARATING LINT AND HULLS.
No. 523,655. Patented July 31, 1894.
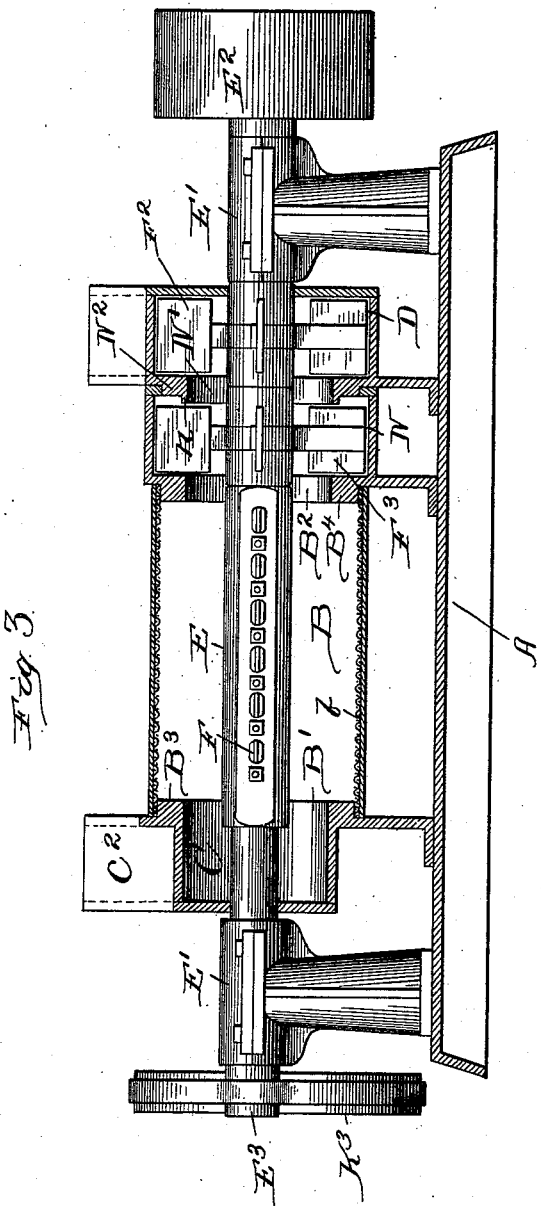
Witnesses.
Inventor.
John P. Burnham
By Munday, Evarts &
Adcock his attys.

UNITED STATES PATENT OFFICE.

JOHN P. BURNHAM, OF CHICAGO, ILLINOIS, ASSIGNOR TO WILLIAM B. ALLBRIGHT, OF SAME PLACE.

ART OF AND MACHINE FOR DETACHING LINT FROM COTTON-SEED HULLS AND SEPARATING LINT AND HULLS.

SPECIFICATION forming part of Letters Patent No. 523,655, dated July 31, 1894.

Application filed June 18, 1892. Serial No. 437,127. (No model.)

*To all whom it may concern:*

Be it known that I, JOHN P. BURNHAM, a citizen of the United States, residing at Chicago, in the county of Cook and State of Illinois, have invented a new and useful Improvement in the Art of and Machines for Detaching the Lint from Cotton-Seed Hulls and Separating the Lint and Hulls, of which the following is a specification.

My invention relates to the art of and to machines for detaching lint from cotton seed hulls and separating the lint and hulls, and it relates more particularly to certain improvements upon the process and apparatus shown and described in my pending application, Serial No. 431,391, filed May 2, 1892.

The object of my present improvement is to further perfect the process set forth and described in my said application by separating the lint from the air current or from the large volume of air by which it is carried, as a continuation or further step of the process, the same revolving or centrifugal motion which is utilized to separate the lint from the hulls being further utilized to further separate the lint from the air current itself, so that the lint may be conveniently collected and discharged into a suitable containing vessel or receptacle.

This result I accomplish, and herein my invention consists by subjecting the volume of lint and air, after the lint has been separated from the hulls, to a rapidly revolving motion in an inclosing chamber or cylinder which operates to separate the lint from the air by centrifugal action and discharge the lint through a peripheral opening in the inclosing chamber or cylinder, while the air escapes through a central opening.

The invention further consists in the apparatus I have devised for carrying out the improved process.

My improvement in the apparatus consists in providing the apparatus shown and described in my previous application with a chamber for the centrifugal separation of the lint and air located between the fan and the cylinder employed for detaching the lint from the cotton seed hulls and separating the lint and hulls; the fan chamber or cylinder, the air and lint separating cylinder and the lint and hull separating cylinder being all located in axial line with each other.

It further consists in providing the annular head or ring which separates the fan cylinder from the air and lint separating chamber with an inwardly projecting flange or lip to prevent the lint from escaping with the air into the fan chamber.

In practicing my invention the cotton seed hulls to be cleaned are subjected, in a retaining cylinder, simultaneously to two opposing forces or actions; one, a powerful centrifugal action; and the other, an axial or central air current; whereby the lint is detached from the hulls and the lint separated from the hulls and carried away by the central air current, while the hulls are discharged through an opening at the circumference or periphery of the inclosing cylinder, as is fully set forth and described in my said previous application. And then the volume of lint and air pass, before reaching the fan chamber, into the air and lint separating chamber where the air and lint are subjected to a rapidly revolving movement, and the lint separated from the air by centrifugal action and discharged through an opening at the circumference or periphery of this lint and air separating cylinder. The air then passes on into the fan chamber and is discharged through its exit opening.

In the accompanying drawings which form a part of this specification and in which similar letters of reference indicate like parts, Figure 1 is a central horizontal section of a machine embodying my improvement, and which is suitable for use in practicing my improved process. Fig. 2 is a vertical cross section on line 2—2 of Fig. 1; and Fig. 3 is a central vertical longitudinal section.

In the drawings A represents the frame, and B the cylinder in which the lint and hulls are detached and separated from each other by the centrifugal action, in connection with the central air current.

N is the cylinder in which the air and lint are separated from each other by centrifugal action in connection with the central air current; and D is the fan chamber or shell.

C is the feed chamber at the feed end of the cylinder B, the same communicating with the central feed opening B' in the head B³ of the cylinder. The head B⁴ of the cylinder B has a central opening B² communicating with the air and lint separating chamber N.

The periphery of the cylinder B is preferably formed of sheet metal and lined on the inside with coarse wire netting $b$ formed of steel wire of about No. 10 gage and with about one-eighth inch mesh. The fan chamber or cylinder D communicates with the air and lint separating chamber N through a central opening N' in the head N² of said cylinder N. The head N² of the air and lint separating chamber N is also furnished with an inwardly projecting flange or lip $n$ to prevent the escape of lint with the air.

E is the revolving shaft centrally extending through the cylinders B N and D, and journaled in suitable bearings E' on the frame of the machine. This shaft is furnished with a driving pulley E² at one end and a small pulley E³ at the opposite end. The shaft E is furnished, in the cylinder B, with a series of radial blades F arranged preferably in two diametrically opposite rows with spaces or intervals F' between the individual blades somewhat wider than the blades. The shaft E is also furnished with wings or blades F² in the fan chamber D, and it may be also provided with wings or blades F³ in the air and lint separating chamber N to aid or increase the revolving movement of the air and lint in said chamber and the separation of the one from the other by centrifugal force.

H is a return trough secured to the frame opposite the discharge opening B⁵ for the hulls and furnished with a screen bottom $h$, the same being made preferably of about No. 18 wire and one-eighth inch mesh. This trough may be closed at the top by a cover and has revolving in it a beater or picker shaft K furnished with teeth or pickers $k$ arranged spirally, about as indicated in the drawings, so that the same will operate to convey the material in this return trough back to the feed end of the cylinder B. Opposite the feed chamber C the picker shaft K is furnished with blades $k'$—and the feed chamber C is furnished with an opening through which the hulls which still have some lint attached to them, and which consequently do not pass through the screen $h$ of the trough H, may be delivered back into the feed chamber C. The shaft K is journaled in suitable bearings K' on the frame of the machine and is driven from the pulley E³ which passes around the pulley K³ on the shaft K.

D² is the exit passage or pipe from the fan chamber D and through which the air is discharged from the machine.

C² is the inlet or feed passage leading into the feed chamber C of the machine.

The air and lint separating chamber N has a lint discharge opening or passage N³ at its circumference or periphery, the same being preferably comparatively small, an inch or such matter in diameter, while the cylinder N is about twelve inches in diameter. By employing a small discharge opening N³ for the lint, the lint is concentrated together, and but a comparatively small quantity of air escapes with it, the air being chiefly discharged into the fan chamber through the central opening N' which is preferably about six inches in diameter. The lint discharge pipe N⁴ connects tangentially with the cylinder N and may serve to deliver the lint into a suitable box or other receptacle.

While my invention is specially designed for detaching and separating the lint from cotton seed or cotton seed hulls, it may however be used for detaching and separating from each other other adhering substances of different specific gravities.

I claim—

1. The process herein described of detaching the lint from cotton seed hulls and separating the lint from the hulls, consisting in subjecting such cotton seed hulls simultaneously to a powerful centrifugal action in an inclosing chamber, and to a central or axial air current whereby the lint is detached from the hulls and the cleaned hulls and lint separated from each other, and then subjecting the lint and air to centrifugal action and a central air current whereby the lint is separated from the large volume of air, substantially as specified.

2. The improvement in the art of detaching lint from cotton seed or cotton seed hulls herein described, the same consisting in subjecting such hulls or seed to a powerful centrifugal action in an inclosing chamber, and simultaneously forcing a current of air of less diameter axially through said chamber to confine the influence of said air current to the lighter particles which are separated from the heavier particles by said centrifugal action, and then subjecting the thus separated lint and air to a further centrifugal action in an inclosing chamber whereby the lint is separated from the air and the lint and air separately discharged in the chamber, substantially as specified.

3. The combination, in a machine for detaching and separating lint from cotton seed hulls, with a lint and hull separating cylinder B having a peripheral discharge opening for the hulls, and a central discharge opening for the air and lint, of a lint and air separating cylinder N communicating with said cylinder B and having a peripheral discharge opening for the lint, and a central discharge opening for the air, substantially as specified.

4. The combination, in a machine for detaching and separating the lint from cotton seed hulls, with a lint and hull separating cylinder B having a peripheral discharge opening for the hulls, and a central discharge opening for the air and lint, of a lint and air separating cylinder N communicating with said cylinder B and having a peripheral discharge opening for the lint, and a central discharge opening for the air, and means for producing a rapid revolving movement in said cylinders, substantially as specified.

5. The combination, in a machine for detaching and separating the lint from cotton seed hulls, with a lint and hull separating cylinder B having a peripheral discharge opening for the hulls, and a central discharge opening for the air and lint, of a lint and air separating cylinder N communicating with said cylinder B and having a peripheral discharge opening for the lint, and a central discharge opening for the air and a fan cylinder or chamber D communicating with said cylinder N, substantially as specified.

6. The combination, in a machine for detaching and separating the lint from cotton seed hulls, with a lint and hull separating cylinder B having a peripheral discharge opening for the hulls, and a central discharge opening for the air and lint, of a lint and air separating cylinder N communicating with said cylinder B and having a peripheral discharge opening for the lint, and a central discharge opening for the air, and a fan cylinder or chamber D communicating with said cylinder N, the head $N^2$ of said cylinder N having central discharge opening $N'$ through the same and furnished with a flange or lip $n$ to prevent the escape of the lint, substantially as specified.

7. The combination, in a machine for detaching and separating the lint from cotton seed hulls, with a lint and hull separating cylinder B having a peripheral discharge opening for the hulls, and a central discharge opening for the air and lint, of a lint and air separating cylinder N communicating with said cylinder B and having a peripheral discharge opening for the air, said cylinder N being also furnished with a lint discharge pipe or nozzle extending tangentially from the periphery of said cylinder, substantially as specified.

JOHN P. BURNHAM.

Witnesses:
H. M. MUNDAY,
EMMA HACK.